United States Patent [19]
Bajat et al.

[11] Patent Number: 5,243,279
[45] Date of Patent: Sep. 7, 1993

[54] ANGULAR POSITION DETECTOR EMPLOYING MAGNETORESISTORS POSITIONED IN PAIRS AT AN ELECTRICAL ANGLE OF ONE HUNDRED AND EIGHTY DEGREES

[75] Inventors: Thierry Bajat; Jean Nesa, both of Mandelieu; Jean-Jacques Digoin, Les Adréts, all of France

[73] Assignee: Aerospatiale Societe Nationale Industrielle, France

[21] Appl. No.: 809,054

[22] Filed: Dec. 17, 1991

[30] Foreign Application Priority Data

Dec. 19, 1990 [FR] France .................. 90 15964

[51] Int. Cl.⁵ .................. G01B 7/30; G01P 3/488
[52] U.S. Cl. .................. 324/207.21; 310/68 B; 324/174; 324/207.25; 340/671
[58] Field of Search .................. 324/173, 174, 207.12, 324/207.20, 207.21, 207.25; 340/671; 310/68 B; 318/653

[56] References Cited

U.S. PATENT DOCUMENTS

| | | | |
|---|---|---|---|
| 3,194,990 | 7/1965 | Kendall | 324/207.2 X |
| 3,501,664 | 3/1970 | Veillette | 324/173 X |
| 4,406,983 | 9/1983 | Ramirez | 324/174 X |
| 4,506,217 | 3/1985 | Rothley et al. | 324/207.21 |
| 4,629,982 | 12/1986 | Kieslich | 324/207.23 |

FOREIGN PATENT DOCUMENTS

| | | | |
|---|---|---|---|
| 1225879 | 9/1966 | Fed. Rep. of Germany | 324/173 |
| 2739877 | 11/1978 | Fed. Rep. of Germany | . |
| 0275746 | 1/1990 | Fed. Rep. of Germany | 324/207.21 |
| 59-221616 | 12/1984 | Japan | . |
| 406128 | 2/1972 | U.S.S.R. | 324/173 |

Primary Examiner—Gerard R. Strecker
Attorney, Agent, or Firm—Hayes, Soloway, Hennessey & Hage

[57] ABSTRACT

Detector of angular position comprising a stator (1) and a toothed rotor (3) in relative rotation. The stator (1) has magnetoresistors (M1 through M8) in pairs and preferably numbering four or a multiple of four. The magnetoresistors in each pair are almost diametrically opposed and in electrical phase opposition to eliminate magnetic torques on the rotor (3). The use of at least two pairs allows a useful signal to be easily obtained for all angles if the signals of the pairs are out of phase at a 90° electrical angle. The detector provides a very high degree of precision, strength and low energy consumption.

10 Claims, 5 Drawing Sheets

ANGULAR POSITION DETECTOR EMPLOYING MAGNETORESISTORS POSITIONED IN PAIRS AT AN ELECTRICAL ANGLE OF ONE HUNDRED AND EIGHTY DEGREES

BACKGROUND OF THE INVENTION

The present invention relates to an angular position detector having magnetoresistors.

An angular position detector having a magnetoresistor system is described in U.S. Pat. No. 4,629,982. A magnetoresistor comprises a permanent magnet and two electrical resistors varying as a function of magnetic flux and arranged in a compact assembly. The magnetoresistor is attached to a fixed part, or stator, in front of which a ferromagnetic disc or rotor turns. The rotor has a serrated structure defining a periodic pattern on it. The magnetic flux passing through each resistor varies as a function of the distance of the teeth closest to this resistance. The bridge of resistance thus becomes unbalanced, which is measured by an appropriate electrical circuit. The signal obtained, which is more or less sinusoidal in shape and the period of which corresponds to the angular pitch of the spacing between the teeth, varies according to a law.

Magnetoresistors offer numerous advantages; they are compact, low cost, require no maintenance and can function at temperatures varying greatly from ambient temperature, particularly at very low temperatures, without being affected. However, they do have some disadvantages. One of the most noteworthy disadvantages is that they produce torque on the rotor and the shaft supporting it so that measurements of angular position are adversely affected and it is not possible to obtain very precise results, particularly if the part supporting the rotor is activated by a motor with low residual torque. Moreover, since the polar space between the rotor and the stator is slight, manufacturing inaccuracies have important consequences for measurement. Finally, in a certain number of cases, it would be preferable to make use of not only what is known as the electrical angle between the rotor and the stator (bearing in mind that a 360° electrical angle corresponds to one step of the rotor structure), but also of the mechanical angle which these parts form.

BRIEF DESCRIPTION OF THE INVENTION

These three disadvantages can be overcome by implementing the invention which consists, in its most general form, of an angular position detector comprising a serrated ferromagnetic rotor and a stator, the detector comprising an even number of magnetoresistors on the stator, with the magnetoresistors being disposed in pairs so that the magnetoresistors in each pair are in electrical phase opposition. The electrical phase opposition nullifies the torque to which the motor is exposed.

As it is rather difficult to produce an appropriate stator directly, it is recommended that the magnetoresistors be mounted on supports connected to the stator with removable fixation means so that the positions of the magnetoresistors along the stator can be separately regulated. One possible way of doing this is to provide stators with sliders between which the magnetoresistor supports can slide, as well as an external strip joining the sliders, with the external strip having elongate, oblong openings along the stator. The magnetoresistor supports thus comprise threaded pins extending beyond the rotor through the openings. Therefore, it is easy to affix the supports with nuts engaging the pins and to manually adjust the support positions by displacing the pins in the oblong openings.

The harmful effects of manufacturing irregularities, particularly rotor shaft vibration, can be eliminated if the magnetoresistors in each pair are disposed in stator positions forming at least 120° mechanical angles (or at the most 240° mechanical angles for reasons of symmetry), and if possible, nearly 180° mechanical angles.

It is preferred to have four magnetoresistors. Actually, it is observed that the signal delivered by a magnetoresistor has generally linear portions over half its extent from one side to the other of the locations where the teeth are symmetrically positioned in relation to the resistors, and which are separated by portions of barely useful curved signals. Therefore, it is advantageous to use two pairs of magnetoresistors, each pair of which conforms to the preceding criteria, with the magnetoresistors in respective pairs being situated at electrical angles of 90°.

The third disadvantage cited can be eliminated by adding a means for detecting the absolute position between the rotor and the stator, which may consist of at least one supplementary magnetoresistor on the rotor which is sensitive to a raised pattern on a plane lateral surface of the rotor. The preferred embodiment of such a system consists of two supplementary magnetoresistors arranged at a different mechanical angle of 0° or 180°; the pattern consists of two raised serrated portions each extending at 180° complementary mechanical angles and to some adjacent rings, each of the two resistors of each magnetoresistor extending in front of a respective ring.

BRIEF DESCRIPTION OF THE DRAWINGS

The invention will now be described in more detail with the help of the following drawings of one preferred embodiment of the invention, which are attached for illustrative purposes and in no way limit the scope of the invention, in which like numerals depict like parts and wherein.

DETAILED DESCRIPTION OF A PREFERRED EMBODIMENT

Figure 1:
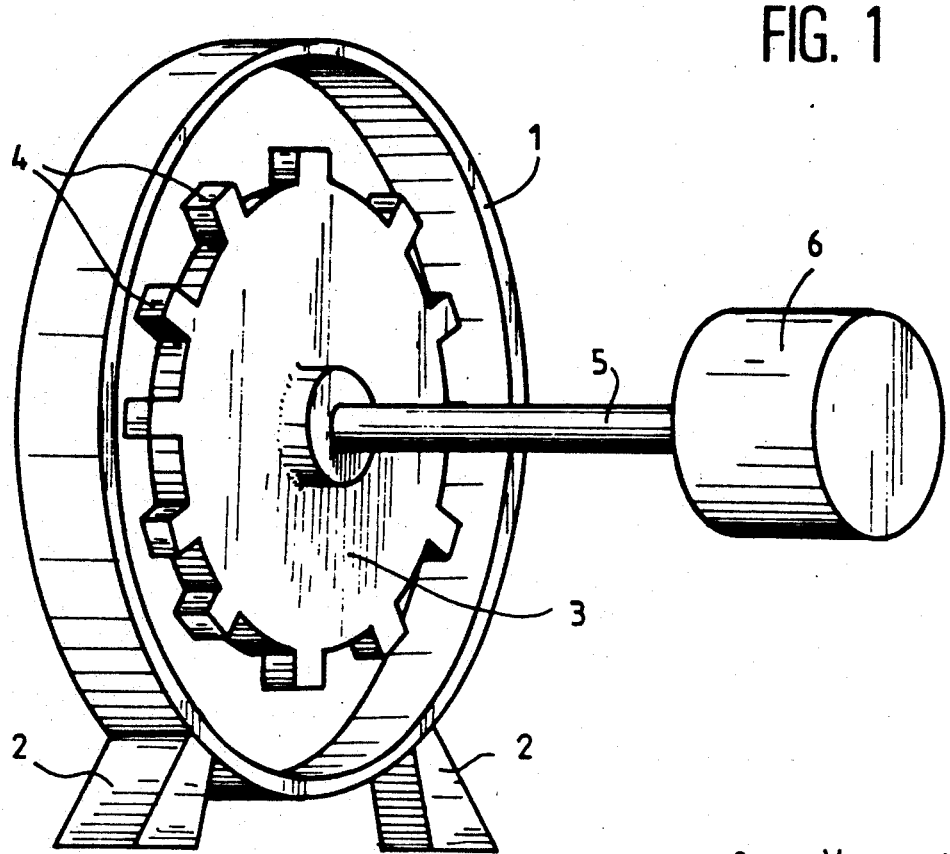
FIG. 1 shows a view of the receptor in its entirety.

The detector of angular position in accordance with the invention comprises, according to FIG. 1, a stator 1 affixed to a stationary structure at anchor points 2 and a disc-shaped rotor 3 which has, at the outside periphery, regularly spaced teeth 4 surrounded by stator 1. Rotor 3 is moved by shaft 5 of a motor 6 or other mechanism. In this disposition, stator 1 and rotor 3 are concentric and in the same plane, in contrast to U.S. Pat. No.

4,629,982 in which the rotor and the stator were separated by a planar space of uniform thickness. Nevertheless, as in the case of U.S. Pat. No. 4,629,982, the rotors are ferromagnetic.

Figure 2:
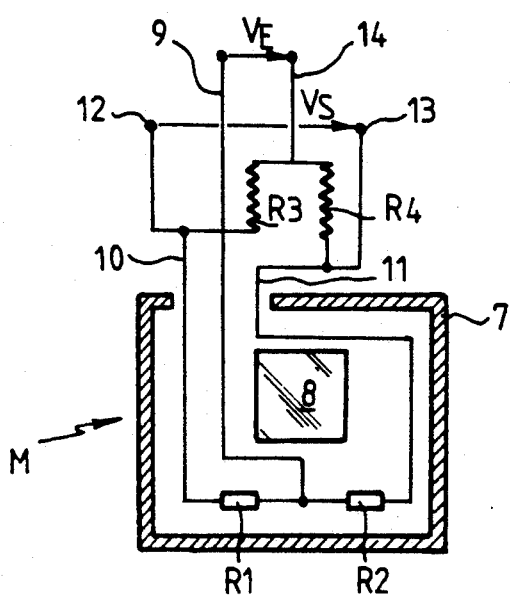
FIG. 2 shows the detail of a magnetoresistor.

Referring now to FIG. 2, each magnetoresistor M comprises, encapsulated in a housing 7, a permanent magnet 8 and two resistors R1 and R2 symmetrically positioned in relation to magnet 8, the resistance of which varies as a function of the magnetic flux surrounding them. Housing 7 is perforated so that electrical wires can pass through it, one measurement wire 9 directly joining the two resistors R1 and R2, and two supply wires, 10 and 11, connecting resistors R1 and R2 to terminals 12 and 13, respectively, of a supply apparatus, not shown, which can produce constant voltage VS between terminals 12 and 13. There is a supplementary wire 14 which connects, by means of a respective resistor R3 or R4, each supply wire 10 and 11 (these resistors are optional). Resistors R3 and R4 have the same value. The voltage between wires 9 and 14 is a measurement voltage VE.

Figure 3:
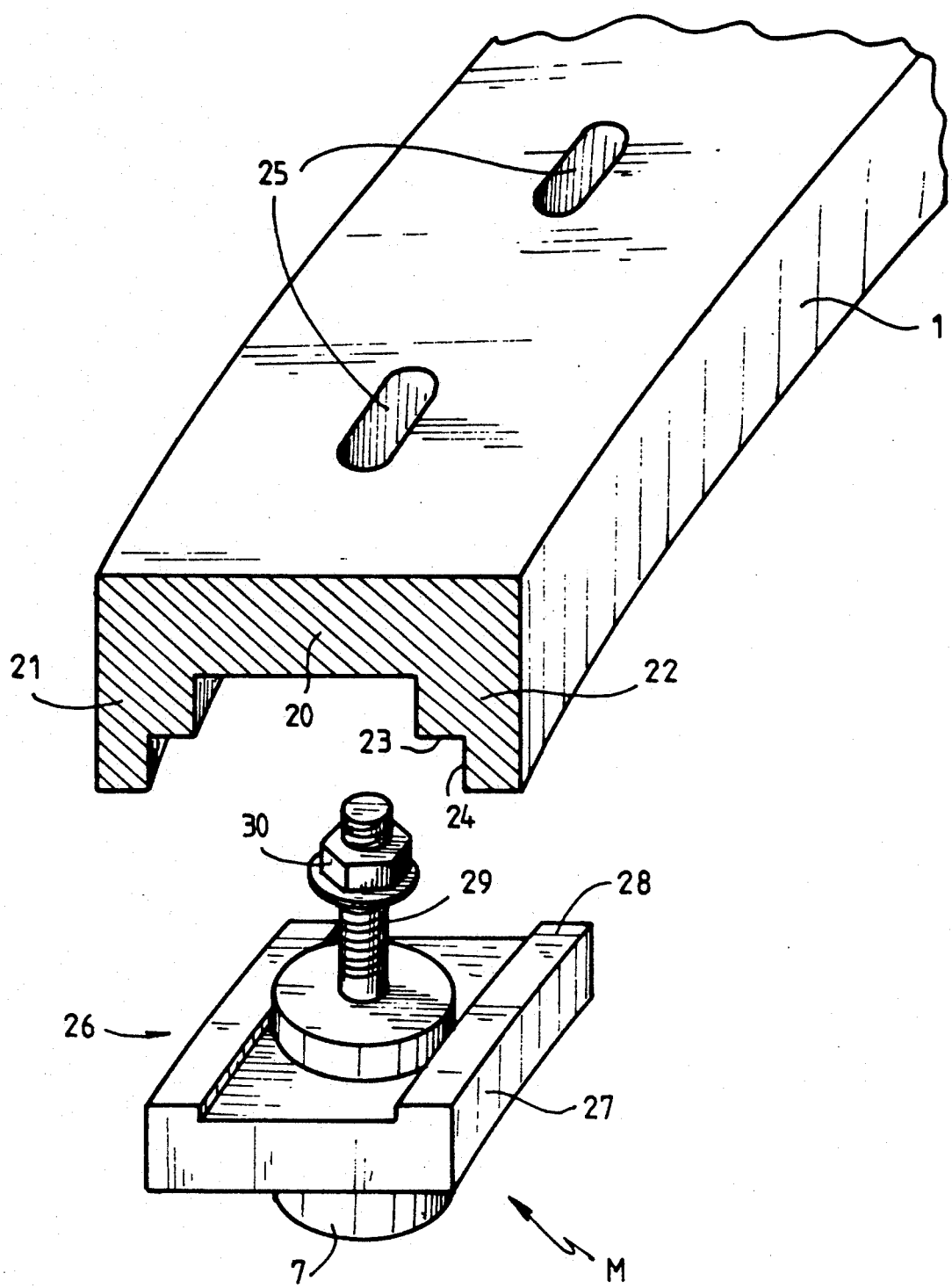
FIG. 3 shows a detail of the stator and of the attachment of the magnetoresistors.

The mechanical makeup of the magnetoresistors M and of stator 1 is more precisely shown in FIG. 3. Stator 1, therefore, is a ring consisting of an external rim 20 joining two lateral sliders 21 and 22 which are symmetrical in relation to the median plane of stator 1 (and of rotor 3). Each slider comprises a radial contact surface 23 facing the inside and a longitudinal contact surface 24, with these two longitudinal surfaces 24 facing each other. In addition, the exterior rim 20 is perforated with oblong holes 25 equal in number to the magnetoresistors, the hole having the largest dimension extending along the length or the circumference of stator 1. As far as magnetoresistors M are concerned, their housing 7 is inserted in a support 26 comprising two external lateral surfaces 27 designed to slide upon lateral contact surfaces 24, and protruding internal surfaces 28 designed to slide upon radial contact surfaces 23. Thus, supports 26 can slide along stator 1. However, these sliding movements are limited by a threaded pin 29 embedded in each housing 7 and which, when magnetoresistor M is attached, extends into respective oblong perforation 25 to traverse it from end to end and terminate outside of stator 1. Therefore, one need only engage a nut 30 on threaded pin 29 to block magnetoresistor M on stator 1. This position can be finely regulated by displacing threaded pin 29 into oblong hole 25 to meet the criteria which will be described.

Figure 4:
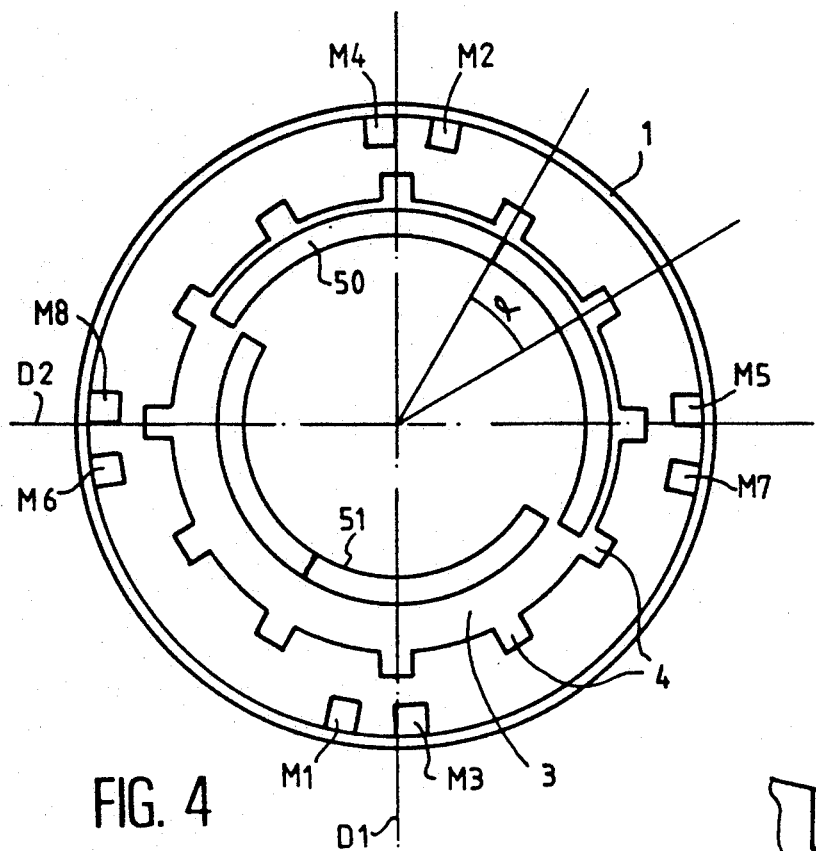
FIG. 4 is a lateral view of the rotor and the stator showing in particular the disposition of the magnetoresistors.

Referring now to FIG. 4, in the preferred embodiment, the detector comprises eight magnetoresistors M1 through M8 arranged in four pairs: the pairs formed by magnetoresistors M1 and M2, M3 and M4, M5 and M6, and finally M7 and M8 are visible. Some specific principles of positioning are noteworthy: first, the magnetoresistors M of each pair are nearly diametrically opposed; the purpose of this is to reduce the effects of vibration or eccentricity in the rotor and stator. Additionally, each magnetoresistor M is near a magnetoresistor in another pair. More specifically, magnetoresistors M1 and M3 are near each other, as are M2 and M4, M5 and M7, and lastly M6 and M8. The first four are located in opposite portions of stator 1 near a diameter D1 and the last four on opposite portions of stator 1 near a diameter D2 which is orthoganal to the preceding one.

All the technical effects of the invention can be obtained with four magnetoresistors such as M1 to M4. Eight of them are used here for the sake of completeness. We will now address in more detail the rules for placement of the four magnetoresistors M1 through M4. Note in passing that raised patterns 50 and 51 surrounding the lateral surface of rotor 3 illustrated will be described later.

Figure 5C:
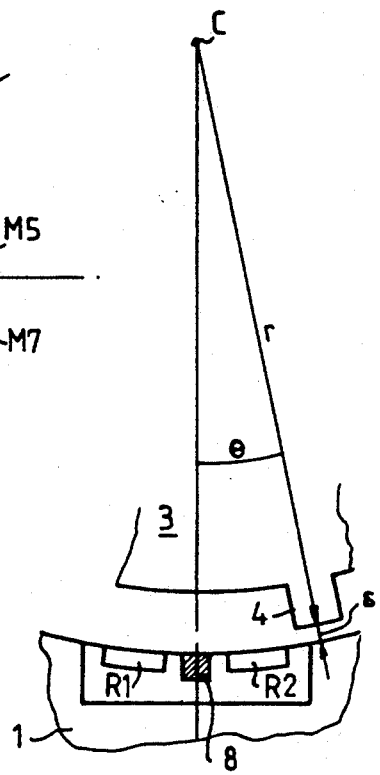
FIGS. 5A, 5B and 5C show three states of the rotor opposite the magnetoresistors.
Figure 5A:
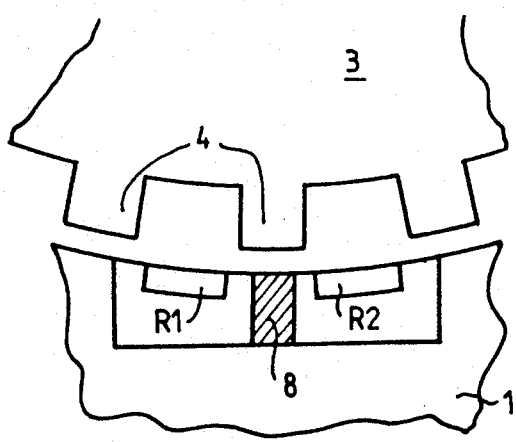
Figure 5B:
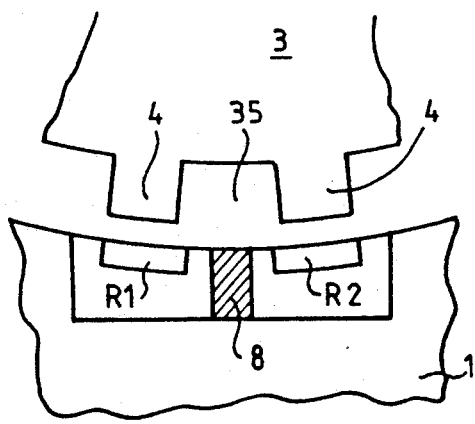
Figure 6:
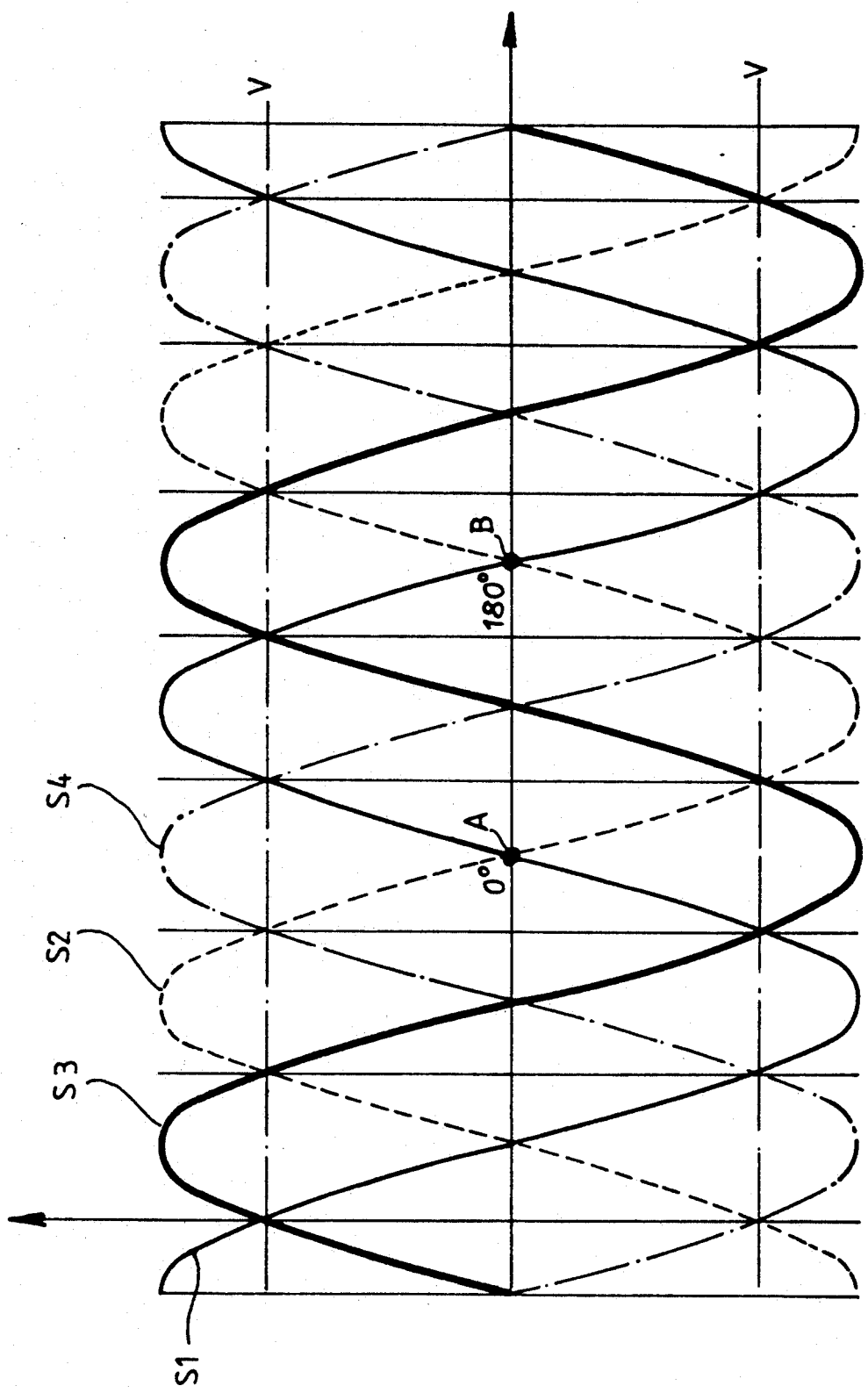
FIG. 6 shows the signals obtained.

FIG. 5A shows a case in which one of the teeth 4 is located just in front of magnet 8, symmetrically in relation to each resistor R1 and R2. Resistors R1 and R2 have the same value at this moment. If rotor 3 is rotated slightly so that magnet 8 is opposite a recess 35 between two consecutive teeth 4, another symmetrical situation will result wherein the values of resistors R1 and R2 will still be equal. Referring now to FIG. 6, where the signals produced by magnetoresistors M1 through M4 are referenced by S1 through S4, it is easy to understand that the preceding positions correspond to a half-period of signals, for example, S1. This half-period is limited by two points A and B corresponding to the states in FIGS. 5A and 5B and where the bridge is balanced (null signal). Now, only one half of these 180° electrical angles is usable because the portions of signals S which are higher in absolute value than value V shown in the drawing cannot be considered linear and therefore are hardly usable. This concerns a median region of 90° of electrical angle between points A and B. Thus, magnetoresistors M3 and M4 are disposed at a 90° electrical angle from magnetoresistors M1 and M2, so as to always maintain one pair of magnetoresistors with usable signals. Referring to FIG. 5C, on the other hand, if δ designates the space between the top extremity of a tooth 4 and the internal diameter of magnets 8, r the radius of the top of teeth 4 from point C corresponding to the center of rotor 3, the maximum force of attraction is equal to $B^2S/2\mu$ for a space close to zero and equal to this maximum force divided by the square of the space when the latter has non-negligible values. If one now supposes that there exists a phase displacement $\theta$ between tooth 4 and magnet 8, it can be shown that rotor 3 undergoes a recall torque proportionate to $\sin \theta$. This recall torque is harmful because it makes the position of rotor 3 unstable and tends to disrupt measurements, especially in situations where it is desirable to use low power, low braking torque motors 6, particularly in space applications.

Therefore, it is suggested that the magnetoresistors of each pair be placed in phase opposition, that is, that anti-symmetrical signals S1 and S2 be obtained, and the same for signals S3 and S4. Thus, the torques which magnetoresistors M produce on rotor 3 always nullify each other, and this is true for each pair of magnetoresistors M. To eliminate the influence of vibrations in shaft 5 and errors of concentricity, the differences (S1−S2) or (S3−S4) are used.

These two conditions on the electrical angles of phase displacement between the magnetoresistors M translate into conditions on the mechanical angles which require them to be mechanically adjusted with great finesse. It is possible, however, to obtain satisfactory results, thanks to the mechanical configurations described with respect to FIG. 3.

Figure 7:
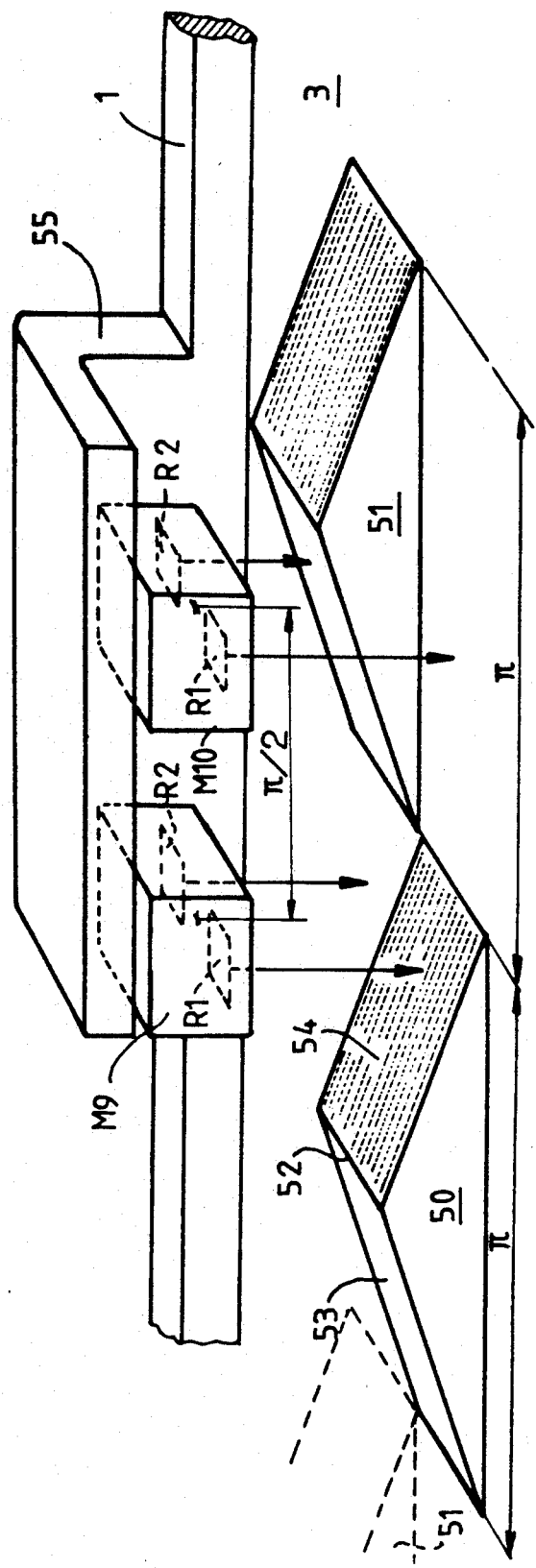
FIG. 7 shows the adaptation of supplementary magnetoresistors to obtain an absolute position detector.
Figure 8:
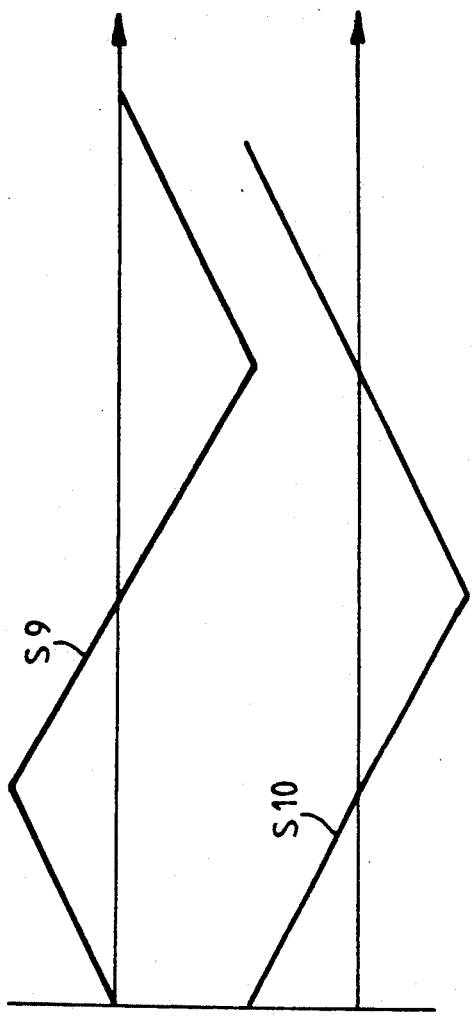
FIG. 8 shows the signals obtained by means of the detector of FIG. 7.

Raised patterns 50 and 51 are also shown in FIG. 7. Rotor 3 and stator 1 are shown opened for ease of representation. Each raised pattern 50 and 51 is a serrated protruberance consisting of a peak 52 of maximum height separating two slopes 53 and 54. Each of the raised patterns extends to a half-circumference, that is, a 180° mechanical angle, and to complementary angular portions on the lateral surface of rotor 3 which supports them, that is, patterns 50 and 51 are located in immediate extension. They are, however, situated on different rings on the lateral surface of rotor 3, that is, of slightly different diameters and thus are transversely offset to a slight degree. This arrangement is used by two supplementary magnetoresistors M9 and M10 supported by a strut 55 integral with stator 1 so that resistances R1 of each supplementary magnetoresistor M9 and M10 are directed toward the ring with one of the raised patterns 50, while the other resistances R2 extend in front of the ring on which the other raised pattern 51 extends. Furthermore, supplementary magnetoresistors M9 and M10 are offset at 90° mechanical angles. Raised patterns 50 and 51 are also made of ferromagnetic material so that signals S9 and S10 for the supplementary magnetometers M9 and M10 are obtained by causing stator 3 to turn: they are serrated signals with a period of a 360° mechanical angle and which are offset at a 90° electrical angle. It is immediately apparent that a comparison of these two signals shows the exact angular position of stator 1 and of rotor 3 for a whole number of turns. It is obvious that other means of realizing such an absolute angular code could be found and in particular, that a 90° mechanical angle displacement is not necessary.

An exemplary embodiment of the present invention comprises a rotor 3 with one hundred teeth having a top width of 1.2 mm and separated by recesses 35 2.2 mm wide, with the teeth 4 being 2.5 mm high. The magnetoresistors comprise cylindrical housings 7 10 mm in diameter and also about 10 mm high. Magnetoresistors M1, M3 and M2, M4 are separated by a distance of some millimeters. Motor 6 may be an oscillation counter motor. Precision to the extent of several minutes of arc or even about ten seconds an arc can be expected. The extraneous residual torque of magnetic origin is valued at about a milli-newton/meter if the position of magnetoresistors M is carefully regulated. Extremely low inertia rotors, of the order of 100 to 150 million kilograms/square meter, are possible. The simultaneous use of a large number of magnetoresistors further decreases residual errors which may subsist. In addition, a high degree of mechanical resistance and improved longevity are made possible, even at very low temperatures or in locations subjected to vibrations. Electricity consumption is about 100 milliwatts for a mass of several hundred grams.

It is also possible to achieve the results of the invention in different ways. For example, a rectilinear, slidable rotor and stator could be designed, as it would be possible to achieve the essential advantage of the invention by disposing pairs of magnetoresistors in phase opposition. Still other changes may be made without departing from the spirit and scope of the invention.

We claim:

1. In an angular position detector comprising a stator and a ferromagnetic rotor provided with a plurality of teeth spaced with a pitch angle, the rotor rotating with respect to the stator according to mechanical angles of rotation, said stator being (a) concentrically positioned with said rotor, (b) affixed to a stationary structure and (c) including a magnetoresistor comprising resistors immersed in a magnetic flux varying as a function of teeth positions, the resistors producing a measured electrical signal depending on the magnetic flux and having a period of 360° electrical angle obtained with a mechanical angle of rotation corresponding to one pitch angle, the improvement wherein said stator carries an even number of magnetoresistors, the magnetoresistors being positioned in pairs on said stator so that said magnetoresistors of each said pair are at an electrical angle equal to 180°.

2. Detector according to claim 1, wherein said magnetoresistors are attached to supports connected to said stator by detachable attachment means allowing the positions of said magnetoresistors to be separately regulated along said stator.

3. Detector according to claim 2, wherein said stator has sliders between which said magnetoresistor supports can slide, and an external strip joining said sliders, said external strip having elongate, oblong openings along said stator, said magnetoresistor supports comprising threaded pins extending beyond said stator through said oblong openings.

4. Detector according to claim 1, wherein said magnetoresistors in each said pair are disposed on said stator at positions forming mechanical angles between 120° and 240°.

5. Detector according to claim 1, wherein said magnetoresistors number four.

6. Detector according to claim 5, wherein said magnetoresistors are disposed at a distance from a magnetoresistor in another pair thereby forming a 90° electrical angle.

7. Detector according to claim 1, further comprising means for detecting the absolute position between said rotor and said stator, said means for detecting having at least two cooperating parts, at least one attached to said rotor and at least one attached to said stator.

8. Detector according to claim 7, wherein said means for detecting said absolute position comprises at least one supplementary magnetoresistor on said stator which is sensitive to a raised pattern on one planar lateral surface of said rotor.

9. Detector according to claim 8, further comprising at least two said supplementary magnetoresistors, offset at a different mechanical angle from 0° to 180°, said pattern comprising two serrated raised patterns each extending over a 180° complementary mechanical angle and slightly transversely offset to adjacent rings, each resistor of each magnetoresistor extending in front of a respective ring.

10. Detector according to claim 1, wherein said magnetoresistors are a multiple of four in number.

* * * * *